Dec. 12, 1967  W. J. CRAVEN  3,357,462
CUTTING BLADE

Filed April 6, 1964  2 Sheets-Sheet 1

INVENTOR.
WILBUR J. CRAVEN

BY Lindsey, Prutzman and Hayes

ATTORNEYS

Dec. 12, 1967 W. J. CRAVEN 3,357,462
CUTTING BLADE

Filed April 6, 1964 2 Sheets-Sheet 2

INVENTOR.
WILBUR J. CRAVEN
BY Lindsey, Prutzman and Hayes
ATTORNEYS

United States Patent Office 3,357,462
Patented Dec. 12, 1967

3,357,462
CUTTING BLADE
Wilbur J. Craven, Glastonbury, Conn., assignor to The Capewell Manufacturing Company, Hartford, Conn., a corporation of Connecticut
Filed Apr. 6, 1964, Ser. No. 358,152
8 Claims. (Cl. 143—133)

This is a continuation-in-part of application Ser. No. 308,109 filed Sept. 11, 1963, now abandoned.

The present invention relates to improved cutting blades and has particular significance in connection with improved saw blades suitable for use with reciprocating saber saws and to a new and improved method of producing such blades.

It is an object of the present invention to provide a novel cutting blade for use with a powered reciprocating chuck, which blade has an improved efficiency and a prolonged useful life span.

Another object of this invention is to provide an improved blade which can be economically manufactured with a minimum of material waste and which appreciably reduces the required cutting time while exhibiting a lessened propensity toward breakage in use.

Still another object of the present invention is to provide a novel and improved cutting blade attachable to a reciprocating chuck which provides not only a greater degree of lateral flexibility in the portion of the blade adjacent the end of the chuck, but also increased strength at that critical portion of the blade.

A further object of this invention is to provide a novel method of manufacturing cutting blades which permits a substantial saving in time and expense of operation while at the same time producing a superior product.

A still further object of this invention is to provide an improved saber saw blade which exhibits improved strength and flexibility at critical portions of the blade and may be economically manufactured.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

Figure 6:
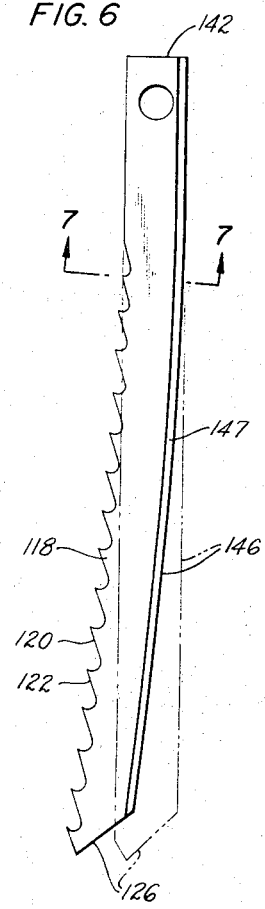
Figure 5:
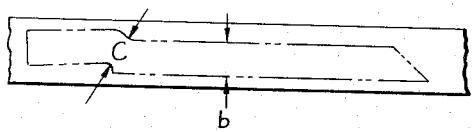
Figure 7:
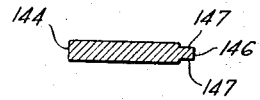

FIG. 5 schematically illustrates a typical prior art method of making saw blades from strip stock;

FIG. 6 is a side view of a saw blade embodying a modified form of my invention; and FIG. 7 is a cross-sectional view of the saw blade of FIG. 6.

In the past, saw blades of the type used in reciprocating saber saws have been produced from blanks in a manner generally shown in FIG. 5. An oversized strip of stock has been provided and the completed blade punched therefrom as depicted in the phantom lines of FIG. 5 with the shank portion disposed at an acute angle to the cutting edge. As will be apparent, this method of manufacture generated a high percentage of scrap since the width of the strip stock must be substantially greater than the width of the finished blades. For example, to produce a blade having a width $b$ equal to .250″, the width of the strip used was .515″ with the result that over 50% of the material was wasted. Moreover, this method produced blades having minimum strength at the juncture of the shank portion and the cutting portion since the width $c$ of the blade was minimum at that point. Moreover, the punching of blades as depicted in FIG. 5 created microscopic cracks, or stress concentration points, around the periphery of the blades further weakening the portion $c$ and reducing its capability of withstanding repeated flexures, and did not lend itself to economical edge treatment to eliminate the cracks.

As disclosed more fully below, the present invention overcomes these problems and provides a cutting blade of unique design having a longer useful life.

Figure 1:
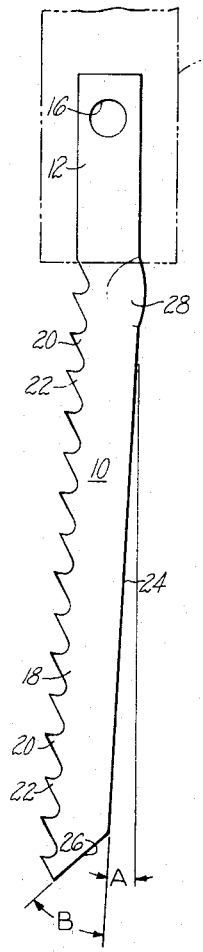
FIG. 1 is a side view of a saw blade embodying the present invention.
Figure 2:
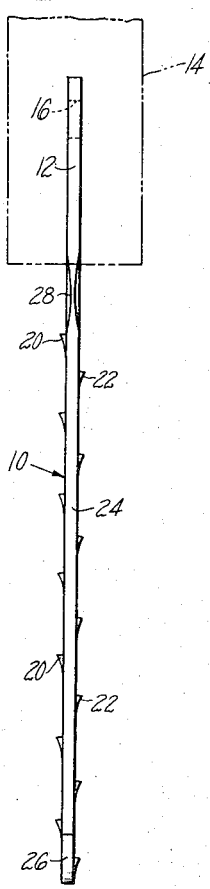
FIG. 2 is a top view of the blade shown in FIG. 1.

Referring now to the invention in greater detail, and more particularly to FIGS. 1 and 2 of the drawings, there is shown, for purposes of illustration, a saw blade 10 made according to the present invention and being detachably mounted through its rectangular shank portion 12 in axial alignment with the axis of reciprocation of a chuck, depicted diagrammatically at 14, by means of aperture 16 located on shank 12. Integrally connected to and extending forwardly of shank 12 is the cutting portion 18 of saw blade 10 which, as shown in FIG. 1, is also of a generally rectangular configuration. Cutting portion 18 is shown as having, along one longitudinal edge thereof, a plurality of cutting teeth 20, 22 which may be alternately set in opposite directions as shown in FIG. 2. A second longitudinal edge, back edge 24, of cutting portion 18 is shown as being uniformly transversely spaced from the cutting teeth 20, 22 and generally parallel to the longitudinal axis of cutting portion 18 which in turn is disposed at an acute angle A to the longitudinal axis of the shank portion 12 to provide an improved cutting action as will be described more fully hereinafter. On the forward end of cutting portion 18 is a leading edge 26 joining the longitudinal edges and tapering rearwardly from the edge containing teeth 20, 22 to the substantially straight back edge 24 at an angle B of, say, about 45 degrees to the longitudinal axis of cutting portion 18.

Integral with and generally located between shank portion 12 and cutting portion 18 is a work-hardened, depressed portion 28 of reduced thickness. The work-hardened portion 28 is symmetrically depressed in an arcuate manner on both sides of saw blade 10, as best shown in FIG. 2, and extends from a point intermediate the longitudinal edge containing cutting teeth 20, 22 and back edge 24 outwardly toward back edge 24 so as to form a raised protrusion thereby increasing the width, and thus the strength, of the saw blade at the juncture of the shank portion 12 and the cutting portion 18. Additionally, any lateral forces imposed on the cutting portion of the blade will result in less severe bending of the blade at the point where it emerges from the chuck 14 due to the greater flexibility of the portion 28 resulting from the reduced thickness thereof and causing the bending to occur on a longer segment of the blade so that it flexes on a greater radius. These factors reduce to a substantial extent the propensity of the blade to snap off at the end of the chuck when subjected to various work forces during use.

When the blade 10 is in use, the shank portion 12 preferably is located so that the longitudinal axis thereof is aligned with the axis of reciprocation of the chuck 14. In this manner the blade is more securely held by the chuck. Additionally, angle A, the angle at which the cutting portion 18 is offset from the shank portion 12, and thus from the axis of reciprocation, can be varied from 1 to about 10 degrees, although an angle of about 3 to 5 degrees is preferred. The blade, having its cutting portion 18 at that angle to the axis of reciprocation of the chuck, will of course only cut during its rearward stroke. Generally, during the forward stroke, the blade will move out of contact with the workpiece. Such clearance of the workpiece by the blade during each stroke permits release of the shavings thus allowing the teeth during the rearward cutting stroke to take a greater bite into the material. Also, by supporting the powered reciprocal chuck so that its weight causes gravity feeding of the blades, it has been found that a highly efficient cutting action is produced without the need for applying a feeding pressure to the blade. Since such a feeding pressure would be imposed on the blade in both directions of reciprocation, this arrangement reduces the power consumption for the cutting operation as well as to reduce the resistance to the movement of the blade away from its shank portion and thus the bending forces imposed thereon.

Figure 3:
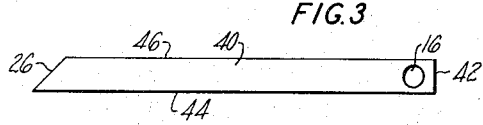
FIG. 3 shows, on a reduced scale, a blade blank utilized in the manufacture of the saw blade of FIG. 1.
Figure 4:
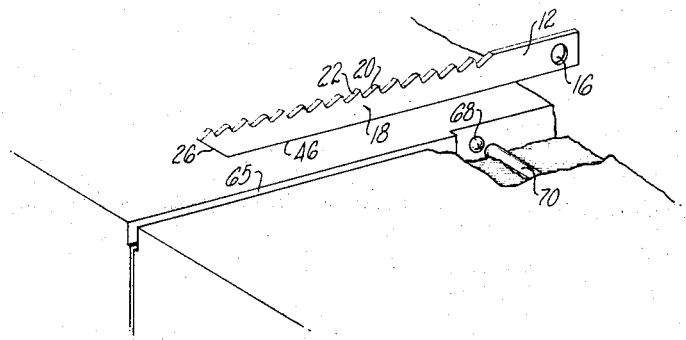
FIG. 4 depicts an important step in the manufacturing process of the blade of FIG. 1.

Turning now to FIGS. 3 and 4, there is depicted the important steps in the manufacture of the cutting blades of this invention. Carbon or high-speed strip steel, or any other material suitable for cutting blades, of any suitable cross section, depending upon the desired product, may be used with advantage in the practice of the invention. As shown in FIG. 3, a steel blank 40 of approximately ¼" width and .05" thickness may be provided and has been used with good results.

The blank 40 is shown as having parallel longitudinal edges 44, 46 which preferably may be economically edge treated to eliminate any microscopic cracks thereon, and may have one of its ends 26 tapered and may possess an aperture 16 to facilitate attachment of the blade to a powered reciprocating chuck.

A cutting edge, such as teeth 20, 22, is formed in any suitable manner, along a major portion of the longitudinal edge 44, say, from leading edge 26 to about ¾" from transverse edge 42 as shown in FIG. 1.

In accordance with this invention, the blades, which then possess a continuously straight longitudinal axis, are treated adjacent one longitudinal edge thereof so as to increase the relative length of that edge. As shown in FIG. 4, this may be accomplished by gripping the back edge 46 of the cutting portion of the blade within groove 65 which extends a distance sufficient to contact only the cutting portion, leaving the shank portion unsupported. The deformation is effected by aligned punches 68 and 70 which simultaneously converge on the blade generally at the juncture of the shank and cutting portions to pinch and deform that portion of the blade beginning at a point intermediate the cutting edge and the back edge causing the metal to cold flow and protrude beyond the longitudinal edge 46. As best shown in FIGS. 1 and 2, the amount of pinching gradually increases toward the back edge 46. The deformed portion 28 is thereby work-hardened and the metal caused to cold flow and protrude outwardly from the back edge 46. At the same time, the pinching action will cause the unclamped shank portion 12 to bend within the plane of the blade in the opposite direction from the protruding metal thus forming the acute angle A between the axes of the shank and cutting portions and effecting the differential lengthening of the edges. The size of the angle can be controlled by restricting the area of the pinch, the force of the deforming stroke, or the distance between punches 68 and 70 at the end of the deforming stroke.

In addition to work-hardening the blade, the deformation increases the width of the blade at the point of deformation, as best shown in FIGS. 1 and 2, to provide increased strength at this critical portion of the blade. Additionally, the pinched portion 28 is reduced in thickness while the shank and cutting portions are not affected. Such a method of producing cutting blades utilizes all but an insignificant amount of the stock material while eliminating the need of punching specific forms for the blades with its associated waste and results in blades having greatly superior operating characteristics over saw blades in which the shank portions and cutting portions are aligned.

Referring now particularly to FIGS. 6 and 7 of the drawings, there is shown another embodiment of this invention which can be produced from the blank 40 of FIG. 3.

In this embodiment of the invention, a cutting edge, such as teeth 120, 122 is formed in any suitable manner along the longitudinal edge 144, say, from the leading edge 126 to about ¾ inch from the transverse edge 142 as shown in FIG. 6. In this form of the invention, the blades which then possess a continuously straight longitudinal axis are treated along longitudinal edge 146 so as to increase the relative length of that edge. This may be accomplished by rolling or otherwise compressively deforming the portion of the back edge 146 along its entire length as shown at 147 in FIGS. 6 and 7. The objects of this invention have been obtained when the back edge was rolled to deform about 20 percent of the width of the blade extending from the untoothed back edge 146 as indicated at 147. Such compressive deformation causes the cutting portion 118 to undergo a slight longitudinal curvature (as indicated by the departure of the finished blade shown in solid lines in FIG. 6 from the blade blank shown in phantom in FIG. 6) due to the weakened cutting edge and increased internal compressive stresses imposed on the deformed longitudinal edge 146 resulting from the compressive deformation thereof until internal compressive stresses of the blade are again in equilibrium. The curvature thus provided improves the cutting capability of the blade since it results in each of the teeth engaging the workpiece during operation. We have found that the entire back edge 146 may be compressively deformed since the amount of compressive deformation required to produce the desired curvature of the cutting portion of the blade results in a negligible curvature of the untoothed shank portion of the blade.

From the foregoing, it is readily apparent that the saw blade of this invention can be produced with minimum waste of stock material and, if desired, the shifting or arcing of the axis of the cutting portion of the blade may be followed by heat treatment to harden the blade.

As will be apparent to persons skilled in the art, various modifications and adaptations of the structure above described will become readily apparent without departure from the spirit and scope of the invention, the scope of switch is defined in the appended claims.

I claim:

1. A cutting blade comprising a shank portion having means for attaching the blade to a reciprocating machine, a cutting portion disposed at an acute angle to said shank portion and having a cutting edge and a back edge spaced from said cutting edge, and a work-hardened compressively deformed portion disposed substantially between said shank and cutting portions and extending from a point intermediate said cutting edge and said back edge outwardly toward one of said edges.

2. A cutting blade comprising a shank portion having means for attaching the blade to a reciprocating machine a cutting portion disposed at an angle of 1 to 10 degrees to said shank portion and having a cutting edge and a back edge substantially uniformly spaced from said cutting edge, and a work-hardened deformed portion generally disposed between said shank and cutting portions and extending from a point intermediate said cutting edge and said back edge outwardly toward one of said edges.

3. A saber saw blade comprising a shank portion having means for attaching the blade to a reciprocating saw, an integral cutting portion disposed at an acute angle to said shank portion and having a toothed edge and a back edge substantially uniformly spaced from said toothed edge, and a work-hardened deformed portion of reduced thickness generally disposed between said shank and cutting portions and extending from a point intermediate said cutting edge and said back edge outwardly toward said back edge.

4. For use with a reciprocating saw, a saber saw blade comprising a shank portion having means for attaching the blade to the reciprocating saw, an integral cutting portion disposed at an angle of 3 to 5 degrees to the longitudinal axis of said shank portion and having cutting teeth along a longitudinal edge thereof and a back edge at a uniform transverse distance from said cutting teeth along a substantial length of said cutting portion, and a work-hardened depressed portion of reduced thickness generally disposed between said shank and cutting portions and extending from a point about midway between said cutting edge and said back edge outwardly toward and arcuately protruding beyond said back edge.

5. A saber saw blade as set forth in claim 4 wherein adjacent cutting teeth extend outwardly in opposite direction from the general plane of said cutting portion.

6. A cutting blade comprising a shank portion having means for attaching the blade to a reciprocating machine and a toothed cutting portion having a longitudinal cutting edge and a longitudinal back edge substantially uniformly spaced from said cutting edge, said back edge being deformed along at least a portion thereof the longitudinal axis of said cutting portion being a continuation of the longitudinal axis of the shank portion but shifted in the direction of the cutting edge.

7. A cutting blade as set forth in claim 6 wherein at least a portion of the length of the cutting portion is gradually and progressively shifted relative to the axis of the shank portion and in ths direction of the toothed edge.

8. A saw blade as set forth in claim 6 wherein the portion of the blade adjacent the untoothed back edge of the cutting portion is compressively deformed from one end to the other to increase the length thereof and to gradually shift the axis of the cutting portion of the blade relative to the axis of the shank portion.

References Cited

UNITED STATES PATENTS 2,783,792   3/1957   Keesling _____ 143—133

DONALD R. SCHRAN, *Primary Examiner.*